Figure 1:
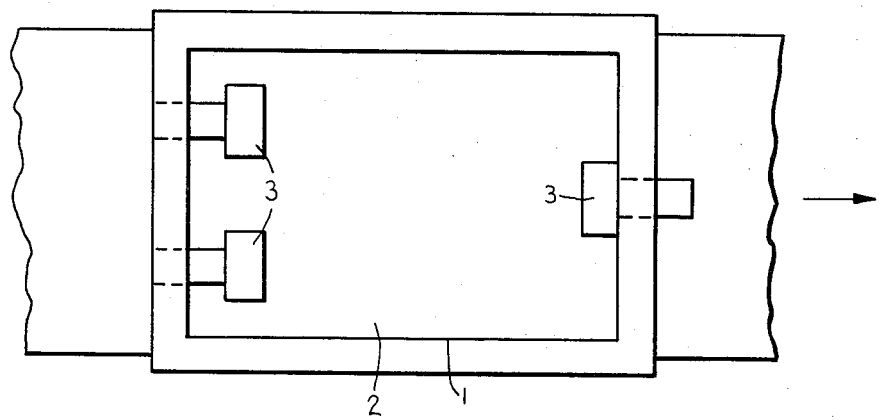
Figure 2:
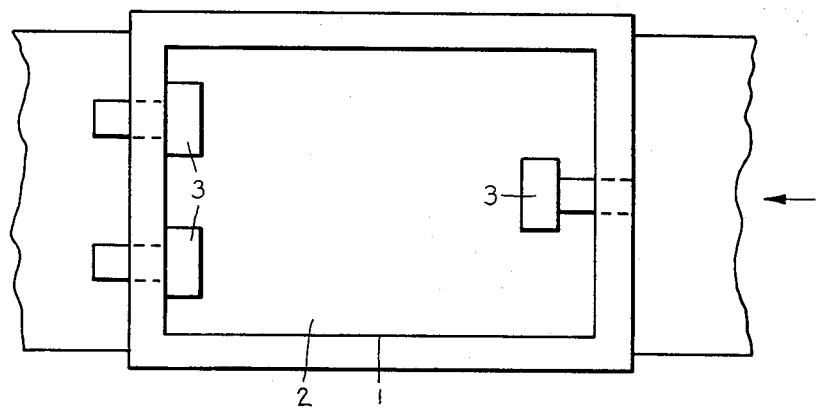
Figure 4:
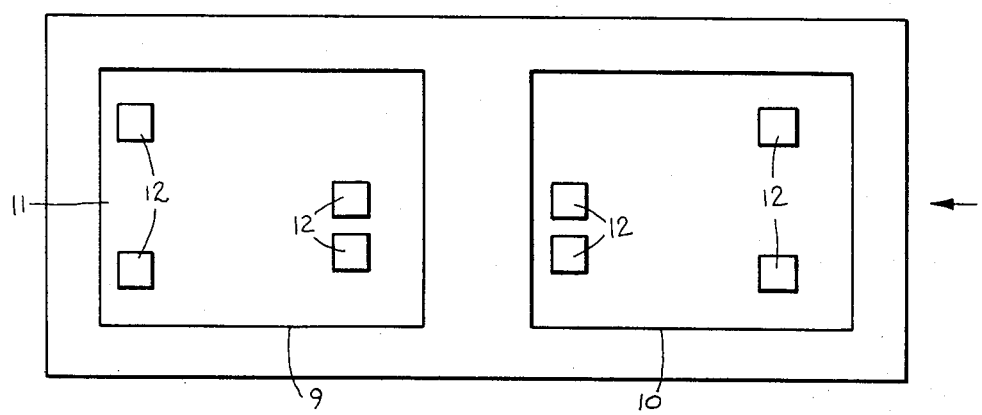
Figure 3:
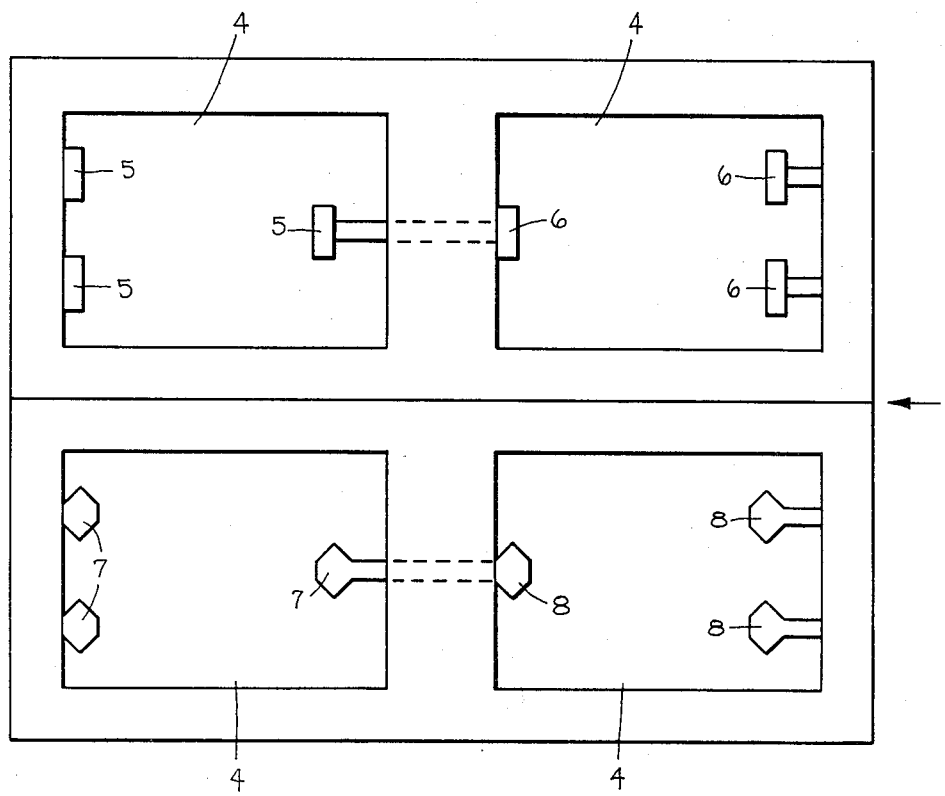

United States Patent
Feldman

[15] 3,692,450
[45] Sept. 19, 1972

[54] APPARATUS FOR THE PRODUCTION OF CONTAINERS

[72] Inventor: Peter Blandford Feldman, Saint Denijs-Western, Belgium

[73] Assignee: Monsanto Chemicals Limited, London, England

[22] Filed: Oct. 29, 1970

[21] Appl. No.: 85,136

Related U.S. Application Data

[62] Division of Ser. No. 750,225, Aug. 5, 1968, Pat. No. 3,619,443.

[30] Foreign Application Priority Data

Aug. 15, 1967 Great Britain...........37519/67

[52] U.S. Cl. .....................425/183, 249/155, 264/89
[51] Int. Cl. ................................................B29c 17/04
[58] Field of Search....18/19 F, 19 R, 19 BM, 19 BC, 18/22, 16 P, 16 R, 34 R, 55; 264/89, 90, 92, 94; 249/155; 164/121

[56] References Cited

UNITED STATES PATENTS

| | | | |
|---|---|---|---|
| 1,533,830 | 4/1925 | Cochran | 249/155 X |
| 2,442,022 | 5/1948 | Schulz | 249/155 X |
| 3,251,460 | 5/1966 | Edmonds | 249/155 X |
| 3,128,725 | 4/1964 | Becker et al | 249/155 |

Primary Examiner—Robert L. Spicer, Jr.
Attorney—Michael J. Murphy and James C. Logomasini

[57] ABSTRACT

A method and apparatus for altering the configuration of a limited portion of a container defining surface of a mold wall after each cycle of a container thermoforming operation, without removing the mold from its place in a machine, so as to prevent successively produced containers from sticking together when stacked or nested.

6 Claims, 6 Drawing Figures

INVENTOR
PETER B. FELDMAN
BY
Michael J. Murphy
ATTORNEY

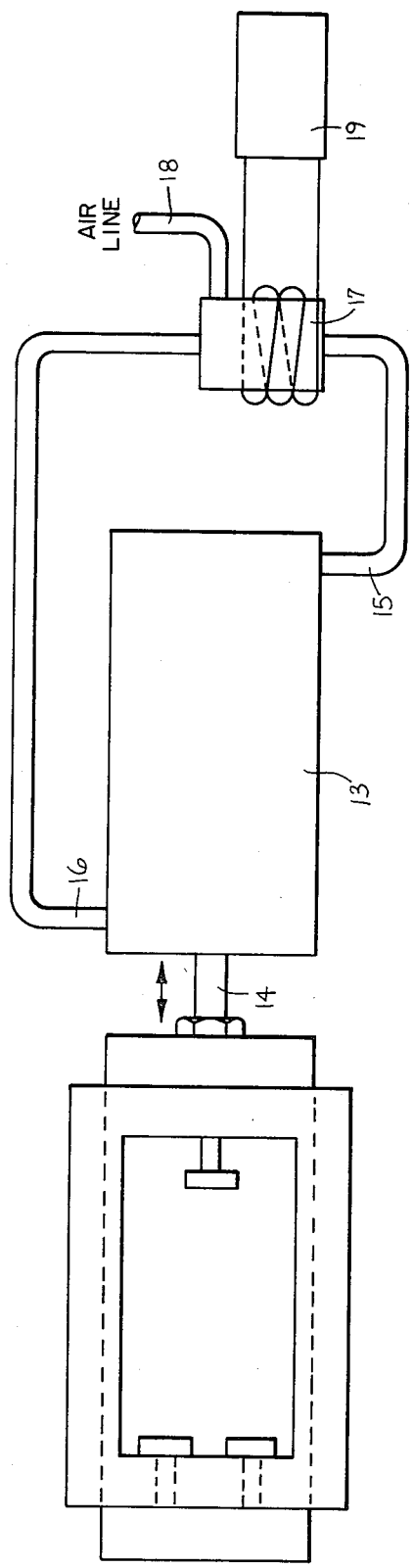
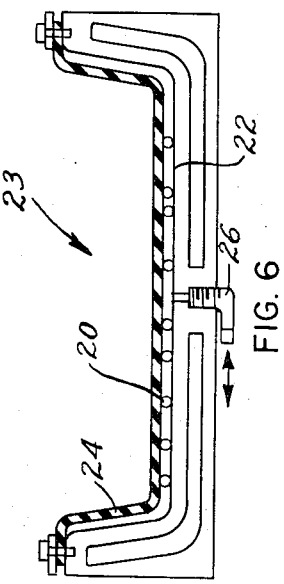
FIG. 5
FIG. 6
INVENTOR
PETER B. FELDMAN
BY
Michael J. Murphy
ATTORNEY

APPARATUS FOR THE PRODUCTION OF CONTAINERS

RELATED U.S. APPLICATION

This is a division of copending application Ser. No. 750,225, filed Aug. 5, 1968 now U.S. Pat. No. 3,619,443.

This invention relates to the production of containers and in particular to a novel mold and process for producing packaging containers.

Packaging containers made from thermoplastic resins are now produced commercially in large numbers. Usually as the containers, all identical in shape, are discharged from the machines in which they are made, they are nested one inside the other in stacks for easy transportation. Once stacked in this way, however, the containers nest tightly together and are difficult to separate causing blockages in the feed system of packaging machines, vending machines or similar apparatus. In particular, it has been found that if an attempt is made to remove a single container either mechanically or by hand from the top or bottom of a stack, either in the case of a top container, by lifting it up, or in the case of a bottom container, by allowing it to fall under gravity, the containers tend to stick together and to come away from the stack in groups, often of three or more. It has been proposed to make containers of such a shape that adjacent containers in a stack are prevented from nesting tightly together, but such proposals have usually involved the production of reentrant or undercut portions in the container wall and this has caused difficulties in manufacture, particularly in ejecting the containers from the mold in which they are formed.

A new mold and process have now been developed by means of which there can be produced packaging containers that are relatively easy to separate.

The invention comprises a mold for use in the production of containers from thermoplastic sheet by means of a differential pressure forming machine, the mold comprising a wall defining a cavity generally conforming to the container peripheral configuration and means for altering the geometrical configuration of a limited portion of the wall of the mold after each forming operation without removing the mold from the machine, the change in configuration being such as to prevent successively produced containers from nesting tightly together.

The invention also comprises a differential pressure forming machine incorporating a mold according to the invention.

Also included within the invention is a process for the production of containers from thermoplastic sheet by differential pressure forming in which there is used a forming machine incorporating a mold that comprises means for altering the geometrical configuration of a limited portion of the mold wall after each forming operation without removing the mold from the machine, the change in configuration being such as to prevent successively produced containers from nesting tightly together.

By differential pressure forming is meant a process in which a heat-softened sheet is forced by means of a differential fluid pressure into conformity with a mold and is there allowed to cool until it is set in the shape of the mold. The process can be of the kind known as vacuum forming where the differential fluid pressure is achieved by reducing the air pressure on the same side of the sheet as the mold, or the more recently introduced pressure forming process where a compressed gas (usually air) is applied to the other side of the sheet; alternatively a combination of both methods may be employed either with or without assistance from a mechanical deforming plug. Either a male or a female mold may be used, but in a preferred apparatus according to the invention the mold is a female one.

Preferably the geometric configuration of the mold is altered automatically after each forming cycle. The alteration in configuration preferably takes place in that part of the mold wall forming the container base but it can take place in a part forming a flange or side-wall. The alteration in configuration can for example be an alteration in the position, size, or shape of a projection or depression in the base, top or a sidewall of the mold, or an alteration in the number of such projections or depressions. Preferably there are two or more depressions or projections spaced apart so as to prevent a container tilting with respect to others in a stack.

Several examples or molds according to the invention are shown in the accompanying drawings, in which:

FIG. I shows a plan view of a single cavity mold according to the invention;

FIG. II shows a plan view of the same mold in its alternative geometrical configuration;

FIG. III shows a plan view of a four cavity mold according to the invention;

FIG. IV shows a plan view of a mold having two cavities;

FIG. V shows a plan view of the mold of FIG. I together with its ancillary operating mechanism; and FIG. VI is a vertical, sectional schematic view of an alternative form of apparatus embodying the present invention.

The mold shown in FIGS. I and II comprises a mold cavity 1 having a base 2 that can be reciprocated relative to the cavity sidewalls between right and left in FIG. I. Three raised projections 3 are arranged as shown on the base and reciprocate with it. FIGS. I and II show the mold with the base displaced to the right and left respectively.

In operation, a container is first formed with the mold cavity in the position shown in FIG. I and is subsequently ejected. The base is then moved to the position shown in FIG. II and a second container formed as before. Due to the different configurations of their bases, the two formed containers will not nest tightly together, and thus they can be easily separated when placed together in a stack.

It will be seen that with the mold described above, alternate containers formed will be identical. This can be a disadvantage because the removal of a container from a production series or the transposition of a pair of containers within such a series results in the tight nesting of one or two container pairs. If it is desired to make a more varied sequence of formed containers the embodiments shown in FIGS. III and IV can be used.

FIG. III shows a mold having four mold cavities which can produce up to four formed containers simultaneously. The mold cavities are mounted on a single reciprocable base 4 which has projections 5, 6, 7 and 8 shaped and positioned as shown. Projections 5 and 6 are shaped differently from projections 7 and 8 and thus four different containers are produced in each forming operation. After each forming operation the base is moved to its alternative position and an additional four different containers are produced.

An arrangement for producing four different containers every two cycles is shown in FIG. IV. In this arrangement there are two mold cavities 9 and 10 having a reciprocable base 11 as before, the base carrying four projections 12 asymmetrically arranged and extending into each of the mold cavities. It will be appreciated that the asymmetrical arrangement of the projections 12 will lead to the production of four different containers in every two forming operations.

Reciprocating movement can be imparted to the base, top or to sidewalls of the mold cavities, whichever is most convenient. Any suitable operating means can be used, for example an electro-pneumatic or electro-magnetic mechanism. An example of an electro-pneumatic mechanism is shown diagrammatically in FIG. V.

The electro-pnuematic operating mechanism comprises an air cylinder 13 having a piston connected by a rod 14 to the mold base. Inlets 15 and 16 connected to opposite ends of the air cylinder are connected to an electromagnetic valve 17 which is in turn connected to a compressed air source 18 and controlled by a timer mechanism 19.

In operation, the air cylinder piston reciprocates within the cylinder under the influence of the compressed air which is directed into alternate ends of the cylinder by the valve. Movement of the piston, and hence of the mold base, is arranged to take place after the end of each forming operation and is preferably triggered by the control system of the differential pressure forming machine. The timing mechanism can be arranged so as to stop the reciprocating base at predetermined intervals along its stroke; in this way a larger selection of different containers can be produced.

The thermoplastic sheet is preferably one of a thermoplastic synthetic resin. Examples of suitable resins are those derived from a polymer or copolymer of a vinyl or vinylidene monomer, preferably a hydrocarbon monomer such as for example ethylene, propylene, butadiene, styrene, vinyltoluene or p-methylstyrene, or a substituted monomer such as for example acrylonitrile, vinyl chloride, vinylidene chloride, vinyl acetate, methyl acrylate, methyl methacrylate or ethyl acrylate. Excellent results have been obtained using polystyrene, especially a biaxially oriented polystyrene such as that sold under the name Polyflex ("Polyflex" is a Registered Trade Mark). Alternatively the sheet can be of a thermoplastic cellulose derivative such as for example cellulose acetate or cellulose acetate/butyrate.

Many alternations can be made to the mold described without departing form the basic concept of the invention. For example the mold as a whole can be inverted so that its base is uppermost, and reference herein to the "base" and "top" should be construed accordingly. As previously stated, movement can be imparted to any wall of the mold, i.e., the base, top or sidewalls of the mold cavity, and the invention is not limited to reciprocal linear movement. For example, any suitable relative movement of the base and mold cavity sidewalls can be used such as for instance reciprocable or successive angular movement. It is not necessary for the base or top as a whole to move; if desired, the movement can be imparted to the projections alone. The projections can take many different shapes and sizes, and for example they can be square, circular, elliptical, T-shaped, hexagonal or any other suitable shape. It is usually found sufficient to use only three or four of these projections, which can be the same or different, but of course more can be used if necessary.

As a further example, the projections, as illustrated in FIG. VI, can comprise a number of discrete lightweight particles 20 randomly arranged on the base 22 of the mold 23 and covered by a rubber 24 or similar flexible diaphragm which is fitted inside the mold cavity. During the forming operation, a vacuum is applied through conduit 26 beneath the rubber diaphragm and then released. The entry and egress of of air that accompanies alternate release and application of the vacuum causes the particles to move about in relation to the mold and to each other, and thus the pattern of indentations produced in the formed containers by their presence in the base of the mold changes during each forming cycle. There is thus produced an infinitely varied series of containers which will not nest tightly together. It is also possible to blow compressed air into the space under the diaphragm, if this is suitably vented to the atmosphere, in order to assist in redisposition of the particles. If the flow of compressed air is sufficiently fast to bring out a partial inflation of the diaphragm this can assist in ejecting formed containers from the mold cavity.

The mold and process of the invention are suitable for the production of a wide range of containers, and especially of disposable containers for use as drinking cups or in packaging, for example trays such as those designed to be fitted with a sealed-on plastic film lid or a snap-on plastic lid.

What is claimed is:

1. An assembly for forming containers from heated sheet material comprising, in combination, a mold having a cavity conforming to the shape of a container, a limited portion of the geometrical surface configuration of said cavity being alterable relative to the remainder thereof, fluid pressure means for forcing successive portions of the sheet into conformity with the surface of the cavity to form the containers, means for ejecting each container from the mold and means operatively synchronized with said fluid pressure means for automatically altering the geometrical surface configuration of said limited cavity surface portion after ejection of each container from the mold.

2. The assembly according to claim 1 wherein the means for altering the geometrical surface configuration includes an electro-pneumatic reciprocable operating mechanism.

3. The assembly according to claim 1 in which the limited portion of the cavity surface comprises projections formed by a number of discrete lightweight particles randomly arranged in the base of the mold and covered by a flexible diaphragm fitted inside the mold cavity, and including means for changing the arrangement of the particles so that successively produced containers are non-identical.

4. The assembly of claim 1 wherein the limited portion of the geometrical surface configuration of said cavity surface comprises a reciprocable base having a series of projections thereon.

5. The assembly according to claim 4, in which the mold has a plurality of spaced alterable limited portions of the cavity surface.

6. The assembly of claim 4 wherein said projections are assumetrically located on the base.

* * * * *